(12) United States Patent
Chintada et al.

(10) Patent No.: US 6,765,870 B2
(45) Date of Patent: Jul. 20, 2004

(54) MEDIUM ACCESS DYNAMIC CONGESTION CONTROL MECHANISM FOR WIRELESS DATA

(75) Inventors: Lakshmana Rao Chintada, Redmond, WA (US); Liang A. Hong, Redmond, WA (US); Kamyar Moinzadeh, Renton, WA (US); Donald P. Wahlstrom, Woodinville, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 710 days.

(21) Appl. No.: 09/745,219

(22) Filed: Dec. 21, 2000

(65) Prior Publication Data

US 2002/0118667 A1 Aug. 29, 2002

(51) Int. Cl.[7] .............................................. G01R 31/08
(52) U.S. Cl. ....................................... 370/230; 370/412
(58) Field of Search ................................ 370/229–230, 370/232, 235.6, 241, 248, 249–252, 310, 310.1, 389, 412, 413, 415, 417, 419, 428

(56) References Cited

U.S. PATENT DOCUMENTS

| | | | |
|---|---|---|---|
| 4,841,526 A | | 6/1989 | Wilson et al. |
| 5,638,371 A | * | 6/1997 | Raychaudhuri et al. .. 370/310.2 |
| 5,684,791 A | | 11/1997 | Raychaudhuri et al. |
| 5,822,300 A | * | 10/1998 | Johnson et al. ............. 370/229 |
| 6,111,876 A | * | 8/2000 | Frantz et al. ................ 370/392 |
| 6,584,114 B1 | * | 6/2003 | Flake et al. .................. 370/437 |

| | | | |
|---|---|---|---|
| 2002/0118639 A1 | * | 8/2002 | Chintada et al. ............ 370/230 |

FOREIGN PATENT DOCUMENTS

| | | |
|---|---|---|
| JP | 61059708 | 9/1987 |
| JP | 02325818 | 7/1992 |
| WO | WO 98/42108 | 9/1998 |
| WO | WO 98/46039 | 10/1998 |

OTHER PUBLICATIONS

"Wireless ATM Reference Architecture," Selected web pages from www.ittc.ukans.edu and www.pvv.ntnu.no Nov. 16, 2000.

* cited by examiner

Primary Examiner—David Vincent
(74) Attorney, Agent, or Firm—Perkins Coie LLP

(57) ABSTRACT

In a wireless communications system, a data link layer and a medium access control layer are connected to each other by data and control paths, where the data path is operable to exchange frames between the data link layer and the medium access control layer and the control path is operable to exchange control messages between the data link layer and the medium access control layer. The data link layer includes a queue for storing frames received from the medium access control layer and the medium access control layer includes a queue for storing frames received from the data link layer. The data link layer is adapted to pass new data frames from a higher layer relative to the data link layer into the data link layer queue and to suspend a retransmission timer upon a congestion message received from the medium access control layer, the congestion message being responsive to a level of stored frames in the medium access control queue.

4 Claims, 4 Drawing Sheets

MEDIUM ACCESS DYNAMIC CONGESTION CONTROL MECHANISM FOR WIRELESS DATA

BACKGROUND

1. Field of the Invention

The present invention relates generally to wireless communications, and more particularly, to a method and system for improving high speed data transmission efficiency between a packet data sending unit and a packet data receiving unit by dynamically controlling the passage of data frames from the data link layer to the medium access control layer of the 7-layer OSI network architecture.

2. Description of the Prior Art

Fixed wireless systems are used to communicate voice and high speed data (HSD) between a base station (BS) and multiple remote units (RU) over an air-interface. HSD is generally used for web browsing, down loads and file transfer protocols (FTP). All data must be transferred notwithstanding the predictable errors caused by the communications links employed in the system (e.g., a 10E-03 Bit Error Rate (BER)). Accordingly, communication protocols have been developed for transmitting data in discrete blocks commonly referred to as "frames." These frames are evaluated at the receiving end to determine if the data is correctly received. If certain frames are in error or missed, those frames are retransmitted by the sending station.

Communications protocols are commonly based on the layered network architecture such as OSI. This is a 7-layer architecture including a physical layer (connectors, media, electrical signaling), a data link layer (DLL), which packages the data into frames, and manages data transmission over a link (error handling and the like), and a medium access control (MAC) layer that facilitates access control (when each station may transmit). One way of achieving full-duplex data transmission over a single communication channel utilizes what is known in the art as a "sliding window protocol." At any instant in time, the sender maintains a list of consecutive sequence numbers corresponding to frames it is permitted to send. These frames fall within a "sending window." In the same manner, the receiver maintains a "receiving window" corresponding to the frames it is permitted to accept. The sending and receiving windows do not necessarily have the same upper and lower limits, or the same size. The sequence numbers within the sender's window represent frames sent but not yet acknowledged. Whenever a new data packet arrives from the network layer, it is given the next highest sequence number, and the upper edge of the window is advanced by one. When an acknowledgement is received, the lower edge of the window is advanced by one. The window continuously maintains a list of unacknowledged frames. Since frames currently within the sender's window may be lost or changed during transmission, the sender must keep all the sent frames in memory in the event a retransmission is required. Accordingly, if the maximum window size is "K", the sender needs K buffers to hold the unacknowledged frames in memory. If the window ever exceeds it's maximum size, the sending data link layer must shut off the network layer until a buffer is freed up. The receiving data link layer's window corresponds to the frames it can accept. Any frame that falls outside the window is discarded. When a frame with a sequence number equal to the lower edge of the window is received, that frame is passed to the network layer, an acknowledgment is generated to the sender, and the window is rotated by one. Unlike the sender's window, the receiver's window always remains at its initial size.

An example of a sliding window protocol in a data communications system is disclosed in U.S. Pat. No. 4,841,526. In the '526 patent, the window size of the sending or receiving station is selected in accordance with the speed, length or error rate of the communication link or frame size used to maximize the communication link. The negative limit acknowledgements sent by the receiving station specify the upper and lower of a range of identification numbers of frames unsuccessfully received to increase transmission efficiency. Before data is transmitted, the sending and receiving stations exchange preferred sets of link parameters and generate a modified set of link parameters to resolve potential conflicts. One of the sending and receiving stations stores a table defining the frame sizes for use with different bit error rates of the communication link. The station evaluates the current bit error rate to select the optimum frame size from the table and adjust the frame size. The '526 Patent also discloses a mechanism for selectively rejecting a plurality of missed frames by identifying the number of successive frames that have to be retransmitted from the sending station, as a "payload" in the selective reject message. In this scheme, a single negative acknowledgment message sent by the receiving station specifies the upper and lower limits of a range of identification numbers of frames that were unsuccessfully received by the receiving station.

In general, the MAC layer is very close to the physical transmission of data (e.g., a wireless transmission) and provides the means of controlling access to the transmission medium in order to provide for an orderly and efficient use of the network's transmission capacity. Examples of well known medium access control protocols include Carrier Sense Multiple Access with Collision Detection (CSMA/CD), Multiple Level Multi-Access (MLMA), binary count down, limited contention protocols, adaptive tree walk protocol and the like. In CSMA/CD, for example, a station seeking to transmit first listens to the transmission medium to determine if another transmission is in progress (i.e., carrier sense). If the transmission medium is busy, the station waits. If the medium is idle, the station can transmit. If two or more stations attempt to transmit at about the same time, there will be a collision and the data will be garbled. To account for this condition, a station will wait a reasonable amount of time after transmitting for an acknowledgment factoring into account the maximum round-trip propagation delay and the need for the acknowledging station to contend for the channel to respond. If there is no acknowledgement, the station assumes that a collision has occurred and retransmits.

In fixed wireless systems, broadband data such as data traveling over the Internet is transmitted over a wireless link, and passed through the MAC layer before transmission. Communication of broadband data is often slower over a wireless link than over other channels. Accordingly, broadband data is communicated from the DLL to the MAC layer at a rate that is typically much greater than that which can be broadcasted over the air link. If the Data Link Layer is driving at a faster rate than the transmission capacity of the airline, the lower layers will quickly fill up a data queue in the MAC layer. The DLL has a retransmission timer associated with the data frames that is activated upon transmission of the frames from the DLL at the packet data sending unit to the packet data receiving unit via the MAC layer. Upon a timeout, an error is assumed and the DLL layer retransmits the data frames to the MAC layer. However, when the MAC layer is congested or busy it may not handle the data frames before a timeout occurs, thereby resulting in wasteful retransmission of frames and a consequent reduction in system performance.

SUMMARY OF THE INVENTION

In view of the above, it is an object of the present invention to provide a system and method for reducing congestion and duplication of data frames transmitted between a packet data sending unit and a packet data receiving unit.

It is another object of the present invention to utilize messaging between the MAC layer and DLL to communicate congestion in the MAC layer so that in response to detected congestion in the MAC layer, the DLL will hold new data frames in a queue in the DLL until it is detected that such congestion has cleared, at which time the DLL will pass the waiting frames from the DLL queue to the MAC layer.

In accordance with the above objects and additional objects that will become apparent hereinafter, the present invention provides a medium access control dynamic control mechanism, in which the DLL and the MAC layer connected to each other by data and control paths. The data path is operable to exchange frames between the DLL and the MAC layer, the control path is operable to exchange control messages between the DLL and the MAC layer. The DLL includes a queue for storing frames received from the upper layer, and a retransmission timer at the expiration of which a data frame is retransmitted from the packet sending unit to the packet receiving unit if an acknowledgement from the packet receiving unit has not been received prior to expiration of the retransmission timer. The MAC layer also includes a queue for storing frames received from the DLL. When congestion at the lower layers is detected, the MAC layer will send a congestion message to the DLL. The DLL is adapted to pass new data frames from a higher layer relative to the data link layer into the DLL queue and to suspend the retransmission timer upon receipt of the congestion message from the MAC layer. In the illustrative embodiment, the congestion message is generated in response to a predetermined level in the MAC queue. The predetermined level can fall within a "congestion range" by setting two predetermined threshold values in the queue. When the congestion range in the MAC queue falls to a certain level, the MAC layer sends a control message indicating an uncongested state to the DLL and frames are then passed to the MAC from the DLL, and the retransmission timer is restarted.

In accordance with the invention, there is also provided a method of using dynamic medium access control to reduce duplication of retransmitted data frames and increase efficiency, comprising the steps of: the MAC layer detecting congestion; the MAC layer communicating a control message with the DLL indicating a congested state; in the congested state, the data link layer placing frames received from a higher layer into a data link layer queue and suspending frame transmission to the MAC layer; and upon receipt of a control message indicating an uncongested state, the DLL sending frames to the MAC layer. The method includes the step of suspending the retransmission timer at the data link layer upon receipt of the control message indicating the congested state, and the step of restarting the retransmission timer at the data link layer associated with at least one frame upon receipt of the control message indicating the uncongested state.

The present invention will now be described with particular reference to the accompanying drawings.

DETAILED DESCRIPTION OF THE PREFERRED EMBODIMENTS

Figure 1:
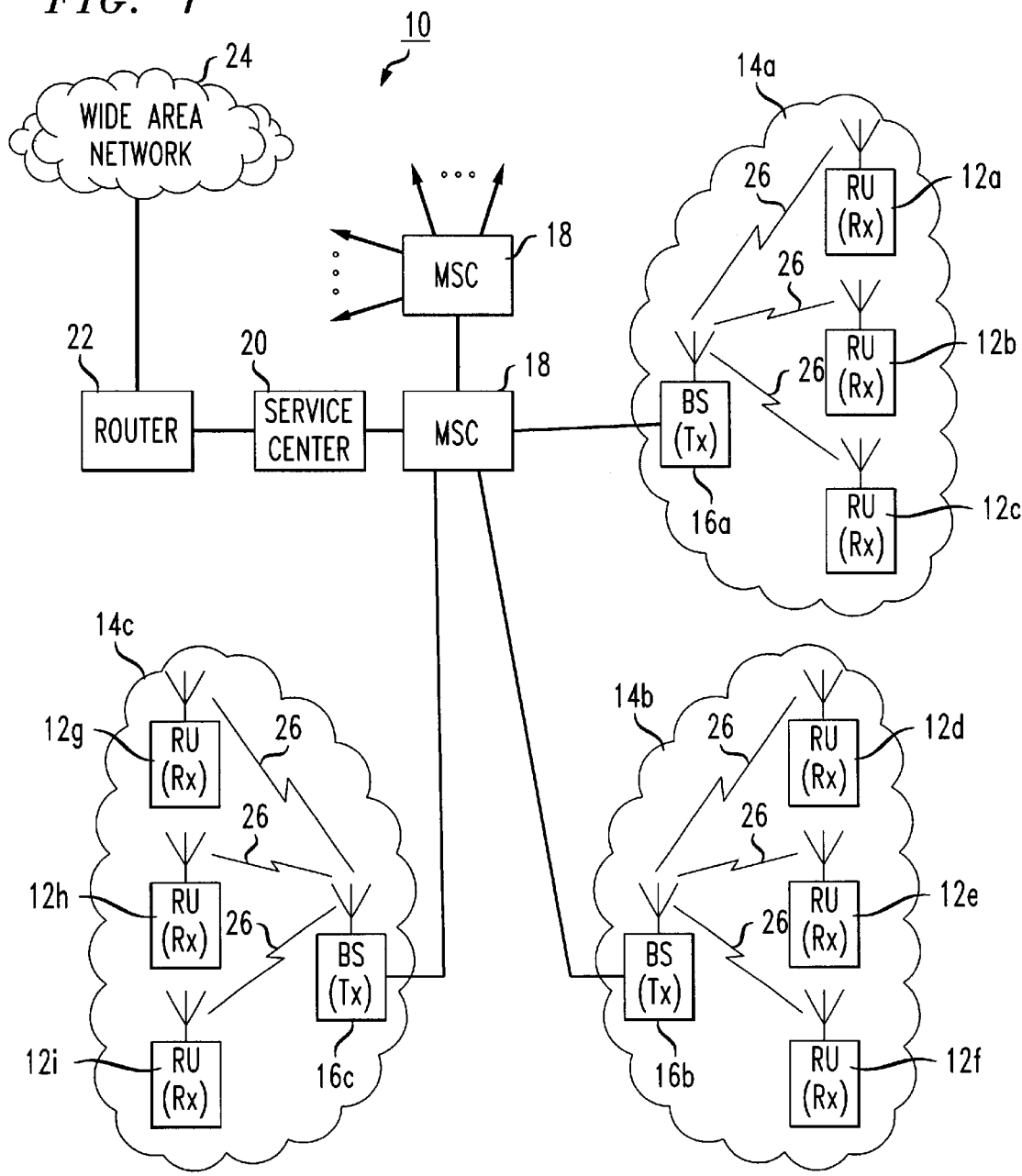
FIG. 1 is a conceptual schematic of a representative wireless communications system.

With reference now to the drawings, FIG. 1 depicts a conceptual diagram of a wireless communications network (WCS) generally characterized by the reference numeral 10. The WCS 10 serves a number of wireless remote units ("RU") $12_{A-I}$ within a geographic area partitioned into a plurality of spatially distinct regions called "cells" $14_{A-C}$. Each cell 14 includes a respective base station ("BS") $16_{A-C}$, and a boundary represented by an irregular shape that depends on terrain, electromagnetic sources and many other variables. The remote units communicate via one or more wireless access technologies (e.g., TDMA, CDMA, FDMA, etc.), providing one or more services (e.g., cordless, cellular, PCS, wireless local loop, SMR/ESMR, two-way paging, etc.) with signals representing audio, video, high speed data (HSD), multimedia, etc. Each BS 16 communicates with a Mobile Switching Center (MSC) 18, also known as a mobile telephone switching office, in accordance with well-known standards. The MSC 18 is interconnected with a customer service center 20 and a router 22 to a wide area network (WAN) 24. The MSC is also connected to local switching offices (not shown) that access wireline terminals, and a toll switching office (not shown). The MSC 18 has several functions, including routing or "switching" calls between wireless communications terminals or base stations or, alternatively, between a wireless communications terminal and a wireline terminal accessible to a MSC 18 through LSOs and/or TSOs. The operation of the WCS is well known and need not be described in detail with respect to the present invention. For the purpose of illustration, a base station (BS) 16 corresponds to a "packet data sending unit" Tx and a remote unit (RU) 12 corresponds to a "packet data receiving unit" Rx. In normal operation data is transferred from Tx to Rx, and Rx sends acknowledgement information back to Tx. The acknowledgment information is communicated in the form of data groups including control information and acknowledgement information, or the acknowledgments are "piggybacked" onto data frames communicated in the opposite direction from Rx to Tx using known protocols. Although the drawings depict an illustrative mobile wireless system, the protocols herein have equal applicability to fixed wireless systems (FWS) which are used to connect a fixed subscriber to a digital switching center and a data service node via a neighborhood antenna.

In the illustrative embodiment, HSD travels over an air data link 26 between Tx and Rx. The data link layer may be "asymmetrical," i.e., the downloading data rate from Tx to Rx can be greater than the uploading data rate from Rx to Tx, or Tx>Rx. As an example, the data downlinked from Tx to Rx is 512 Kilo bits per second (Kbps), and the data uplinked from Rx to Tx is 128 Kbps. In accordance with the sliding window protocol, at any instant in time Tx maintains a list of consecutive sequence numbers corresponding to frames it is permitted to send. These frames fall within a "sending window." In the same manner, Rx maintains a "receiving window" corresponding to the frames it is permitted to accept. The sending and receiving windows do not necessarily have the same upper and lower limits, or the same size. The sequence numbers within the sender's window represent frames sent but not yet acknowledged. Whenever a new data packet arrives from the network layer, it is given the next highest sequence number, and the upper edge of the window is advanced by one. When an acknowledgement is received, the lower edge of the window is advanced by one. The window continuously maintains a list of unacknowledged frames. Since frames currently within the sender's window may be lost or changed during transmission, the sender must keep all the sent frames in memory in the event a retransmission is required. Accordingly, if the maximum window size is "K", the sender needs K buffers to hold the unacknowledged frames in memory. If the window ever exceeds it's maximum size, the sending data link layer must shut off the network layer until a buffer is freed up. The receiving data link layer's window corresponds to the frames it can accept. Any frame that falls outside the window is discarded. When a frame with a sequence number equal to the lower edge of the window is received, that frame is passed to the network layer, an acknowledgment is generated to the sender if the poll bit is set to "1" (P=1), and the window is rotated by one. Unlike the sender's window, the receiver's window always remains at its initial size. In the illustrative example the window size (K)=45, and the maximum sequence number Ns=127 ($2^7-1$). This means that Ns varies from 0 to 127 and subsequently rolls over. In high bandwidth systems, the sequence numbers can go up to 16,383 ($2^{14}-1$). As shown in the drawings, the poll bit setting equals the last acknowledged frame+K−1, or the last acknowledged frame+(K*3)/4. Alternatively, the poll bit may be specified at any other time for explanation purposes only.

The following terminology regarding the interchange of information between Tx and Rx applies throughout this application and is listed below for reference as it is well understood by those skilled in the art:

Send state variable V(S): a variable that identifies the sequence number of the next frame to be transmitted. The V(S) is incremented with each frame transmitted.

Receive state variable V(R): a variable that denotes the number expected to be in the sequence number of the next frame. The V(R) is incremented with the receipt of an in-sequence and error-free frame.

Send sequence Number(Ns): this number indicates to the receiver the sequence number of the next frame that will be transmitted by the sender.

Receiving Number N(R): an expected send sequence number (Ns) of then next to be received frame. It indicates up to N(R)−1 frames that were successfully received.

Acknowledge state variable V(A): the last frame that has been acknowledged by the sender's peer. The Va is updated upon receiving an error free I or Supervisory (S) frame in sequence having a receiving sequence number Nr value is one that is in the range of Va<=Nr<=Vs.

| Type | Description | value 512 Kbps |
|---|---|---|
| K | window size: window size of sliding window protocol. | 45 |
| T200 | Re-establishment/retransmit timer: Tx expects an acknowledgement before the T200 timer expires. Tx retransmits the same packet N200 times before it gets an acknowledgment until T200 expires. | 5 Sec |
| T201 | SREJ Recovery Timer: Acknowledgements for retransmitted out of sequence frames should occur before T201 expires. If T201 expires Tx retransmits the out of sequence I frame N201 times before re-establishment. | 5 Sec |
| T202 | SREJ Retransmit Timer: The out-of-sequence frame should be received before T202 expires, otherwise Rx retransmits the SREJ frame N202 times before re-establishment. | 5 Sec |
| T203 | Idle Timer | 20 Sec |
| T205 | Piggy Back Timer | 2 Sec |
| N200 | T200 Retry Count | 5 X |
| N201 | T201 Retry Count | 5 X |
| N202 | T202 Retry Count | 5 X |

The data link layer uses an "Information Frame" or "I"-frame as discussed above, to represent a protocol data unit (PDU) transmitted between a packet data sending unit and a packet data receiving unit (i.e., Tx and Rx). An illustrative frame format is shown below:

| 8 | 7 | 6 | 5 | 4 | 3 | 2 | 1 | |
|---|---|---|---|---|---|---|---|---|
| Address Field (TEI) | | | | | | | | Address field size: 2 octets |
| Length Field | | | | | | | | Length field size: 2 octets |
| Control Field | | | | | | | | Control field size: 2 to 5 octets |
| Information Field | | | | | | | | Info. field size: Up to 251 bytes |

The basic numbering convention is based on bits grouped into octets as specified in the Q.921 recommendation that is well known in the art.

The address field is represented by the Terminal Endpoint Identifier (TEI) assigned to each RU, and two control bits. The address field extension (EA) bit is used to indicate the extension of TEI octets. When set to "0", it signifies that another octet of the TEI follows. A "1" indicates that it is the final octet. The command/response (C/R) bit identifies a frame as either a command or a response. The transmitter sends commands with C/R set to "1" and responses with C/R set to "0". The RU does the opposite with commands with the C/R set to "0" and responses with the C/R set to "1". The address field format is shown below:

| 8 | 7 | 6 | 5 | 4 | 3 | 2 | 1 |
|---|---|---|---|---|---|---|---|
| C/R | | | TEI (higher order) | | | | |
| | | | TEI (lower order) | | | | EA=1 |

The frame length field indicates the total data link frame length in bytes and includes the data rate as follows:

| 8 | 7 | 6 | 5 | 4 | 3 | 2 | 1 |
|---|---|---|---|---|---|---|---|
| octet 1 | data rate | | RES | | higher order 3 bits | | |
| octet 2 | Lower order 8 bits | | | | | | |

The data rate is used for Tx to identify and communicate with different receiving stations. The control field contains the commands, responses, and the sequence numbers to maintain data flow accountability of the link between the Tx and Rx. It also defines the frame functions and invokes logic to control traffic. The content and size of the control field vary according to the use of the frame. The field can be in one of three formats: information (I), supervisory (S), and unnumbered (U).

The information frame (I-frame) which is shown in the drawings, is used to transmit end-user data between Tx and Rx. The information frame may also acknowledge the receipt of data from a transmitting end point. It also can perform such functions as a poll command. Traffic at Tx and Rx is controlled by counters called state variables. These counters will be maneuvered based on the received I-frame control field values. The I-frame control field format is shown below:

| | 8 | 7 | 6 | 5 | 4 | 3 | 2 | 1 |
|---|---|---|---|---|---|---|---|---|
| octet 1 | (higher order) N(S) | | | | | | | 0 |
| octet 2 | N(S) (lower order) | | | | | | | P/F |
| octet 3 | N(R) higher order) | | | | | | | |
| octet 4 | N(R) (lower order) | | | | | | RES | |
| octet 5 | M | | EM | RES | | SAPI | | |

The sequence number Ns is the identification number for the I-frame. Typically the I-frames are numbered in the same order as their transmission. Similar to Q.921, I-frames are always exchanged as command type frames during multiple frame operation on point-to-point connections. A Poll/Final (P/F) or "Poll Bit" is used to solicit a response from the peer entity. When the P bit set to 1 (P=1), the sender Tx will solicit a response frame from Rx. The More (M) bit is used to indicate that the current PDU is the last data unit in a complete application packet. The I-frame may support either an encrypted or unencrypted payload. This is not relevant to the present invention but is included for purposes of illustration with respect to frame formats as the Encryption Mode Enabled/Disabled (EM) bit. Finally, the Service Access Point Identifier (SAPI) includes 4 bits that indicate the target application type. The values are defined as: 0x0000—IP SAPI, 0x0001—OM SAPI, 0x000—SA SAPI.

The supervisory frame (S-frame) is used to perform such control functions as acknowledgment of frames, request for retransmission of frames, and request for the temporary suspension of frame transmission. The supervisory frame format follows:

| | 8 | 7 | 6 | 5 | 4 | 3 | 2 | 1 |
|---|---|---|---|---|---|---|---|---|
| octet 1 | Reserved | | | S-Type | | | 0 | 1 |
| octet 2 | P/F | N(R) (higher order) | | | | | | |
| octet 3 | N(R) (lower order) | | | | | | | RES |

The supervisory frame supports 3 different command/response types: Receive/Ready (RR); Receive Not Ready (RNR) and Selective Reject (SREJ). N(R) is the expected send sequence number of the next I-frame to be received. The Poll/Final bit (P/F), unlike an I-frame, can be used to signify either command or response mode. In the command frame, the P/F bit is referred to as the P bit; and in response frame, it is referred to as F bit. The reserved field value is set to 0.

The receive ready (RR) frame format is used to indicate that Rx is ready to receive an I-frame, acknowledge a previously received I-frame numbered up to and including N(R)−1, clear a busy condition that was indicated by the earlier transmission of an RNR frame, and solicit Tx's status by sending an RR command with the P bit set to 1. The RR frame format follows:

| | 8 | 7 | 6 | 5 | 4 | 3 | 2 | 1 |
|---|---|---|---|---|---|---|---|---|
| octet 1 | 0 | 0 | 0 | 0 | 0 | 0 | 0 | 1 |
| octet 2 | P/F | N(R) (higher order) | | | | | | |
| octet 3 | N(R) (lower order) | | | | | | | RES |

The receive not ready (RNR) frame is used to indicate a busy condition where it is unable to accept additional incoming I-frames temporarily. The value of N(R) acknowledges I-frames up to and including N(R)−1. The busy condition can be cleared by sending a RR frame. The RNR also enables Tx to solicit the status of Rx by sending the RNR command with the P bit set to 1. The RNR frame format follows:

| | 8 | 7 | 6 | 5 | 4 | 3 | 2 | 1 |
|---|---|---|---|---|---|---|---|---|
| octet 1 | 0 | 0 | 0 | 0 | 0 | 1 | 0 | 1 |
| octet 2 | P/F | N(R) (higher order) | | | | | | |
| octet 3 | N(R) (lower order) | | | | | | | RES |

The SREJ frame is used to request retransmission of single frame or multiple frames in accordance with well-known practice. When sent as a command frame, if the P bit of the SREJ frame is set to 1, the I frames numbered up to N(R)−1 inclusive, are considered as acknowledged. However, if the P bit is 0, then the N(R) of the SREJ frame does not indicate acknowledgment of I frames. In a response frame, no acknowledgment is allowed. The SREJ condition is cleared upon receipt of an I-frame with an N(S) equal to the N(R) of SREJ frame. Once a SREJ frame has been received, the I-frame that may have been transmitted following the I-frame indicated by the SREJ frame is not be retransmitted as a result of receiving the SREJ frame. Additional I-frames awaiting initial transmission may be transmitted following the retransmission of the requested I-frame. The SREJ frame format is illustrated as follows:

| 8 | 7 | 6 | 5 | 4 | 3 | 2 | 1 |
|---|---|---|---|---|---|---|---|
| 0 | 0 | 0 | 0 | 1 | 1 | 0 | 1 |
| P/F=0 | N(R) (higher order) | | | | | | |
| | N(R) (lower order) | | | | | | RES |

Figure 2:
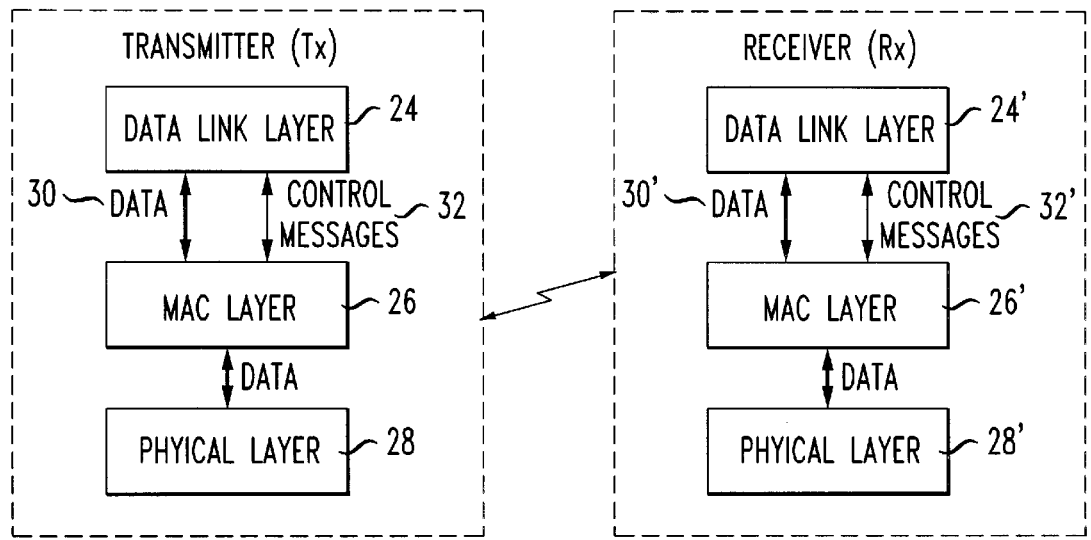
FIG. 2 is a block diagram of Tx and Rx.

Referring now to FIG. 2, the DLL 24 is generally considered as the logical link between Tx and Rx. The MAC layer is very close to the physical transmission of data (e.g., a wireless transmission) represented at 26 and provides the means of controlling access to the transmission medium or physical layer 28 in order to provide for an orderly and efficient use of the network's transmission capacity. Examples of well known medium access control protocols include Carrier Sense Multiple Access with Collision Detection (CSMA/CD), Multiple Level Multi-Access (MLMA), binary count down, limited contention protocols, adaptive tree walk protocol and the like. In CSMA/CD, for example, a station seeking to transmit first listens to the transmission medium to determine if another transmission is in progress (i.e., carrier sense). If the transmission medium is busy, the station waits. If the medium is idle, the station can transmit. If two or more stations attempt to transmit at about the same time, there will be a collision and the data will be garbled. To account for this condition, a station will wait a reasonable amount of time after transmitting for an acknowledgment factoring into account the maximum round-trip propagation delay and the need for the acknowledging station to contend for the channel to respond. If there is no acknowledgement, the station assumes that a collision has occurred and retransmits.

The MAC 26 is primarily responsible for accessing the transmission medium under shared media. Accordingly, the MAC layer 26 knows the transmission capacity of the physical layer acquired for any given user. The MAC layer 26 is connected to the DLL 24 via a data path 30 and a control path 32. These two paths can be established over the same or independent physical media. PDUs are exchanged as frames over the data path 30 and control messages are exchanged over the control path 32. The control messages are used for messaging between the DLL 24 and the MAC layers. These control messages are transported over, by way of example, a Host Port Interface (HPI) layer. The HPI layer can be thought of as an acknowledged message delivery service with a sliding window of one. The HPI layer calculates a 16-bit checksum on all messages and transmits the frames along with the checksum to the receiver. At the receiver, the HPI recalculates the checksum of the payload and verifies it with the one it received with the payload. If the checksum is correct, the frame is transmitted to the upper layer. If the checksum is incorrect, the receiver sends a different message to the transmitter indicating that a checksum error has occurred. Upon receiving this indication, the transmitter retransmits the same message. A configurable number of retries is supported and if the maximum number of retries is exceeded, the message is discarded. The following is the physical layer format for HPI messages. HPI messages are transported with a header containing a checksum and data word length:

```
typedef struct
{
    UINT16 chksum;      /* 16-bit checksum starting from len */
    UINT16 len;         /* length of data section in words */
    UINT16 event;       /* For DSP-HOST messaging */
    UINT16 dest_cpid;   /* For DSP-HOST messaging */
    UINT32 dest_portid; /* For DSP-HOST messaging */
} HPI_MSG_HDR;
The entire frame follows:
typedef struct
{HPI_MSG_HDR hpi_hdr;  /* HPI message header */
UINT16 data [MAX_HPI_DATA_WORDS];/* data payload */}
HPI_MSG;
```

Where MAX_HPI_DATA_WORDS (the data payload) is 127 words long.

The memory layout in words of an HPI message follows:

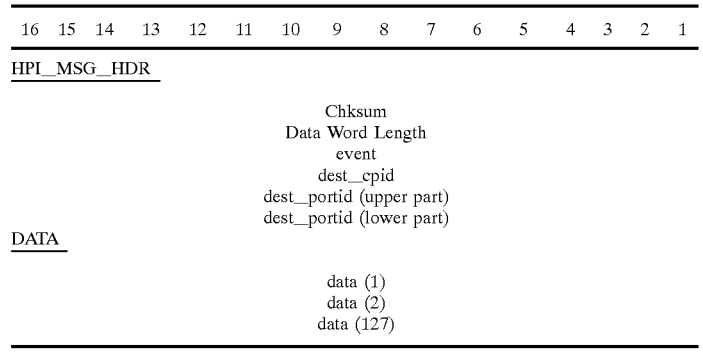

Figure 3:
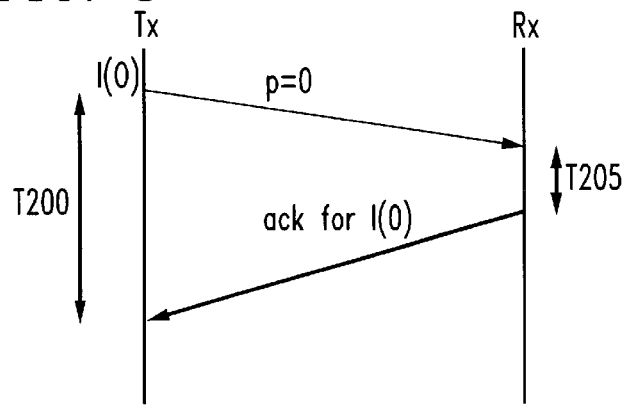
FIG. 3 is an operational flow diagram of the normal data transfer between a packet transmitting station Tx and a packet receiving station Rx, respectively, showing single frame transmitted, an acknowledgment ACK for the frame, and the retransmission and piggyback timers.

Referring now to FIG. 3, there is depicted a normal data transfer sequence between Tx and Rx. Rx will immediately acknowledge all I-frames received with the poll bit ON (P=1). If the poll bit is OFF (P=0), Rx starts the "piggyback timer" T205 and waits for upper layer data to be communicated to Tx. If Rx receives the upper layer data prior to the expiration of T205, the acknowledgment (ACK) is piggybacked onto that data. If T205 expires prior to receiving the upper layer data, Rx immediately sends an ACK upon T205 expiration. When Rx detects that a frame is missing (i.e., lost), it implements a protocol to recover the lost frames (not the subject of the present invention). When the data link and upper layers are processing information frames at a rate faster than the capacity of the air link, the upper layer frames are kept in a queue until the congestion is relieved. The data link layer, however, does not know where a frame became hung up. It is only concerned with timer T200 that governs when to retransmit missed frames that are lost in transit between Tx and Rx. The MAC dynamic congestion control mechanism in accordance with the present invention allows the MAC to indicate to the DLL 24 that the data link layer should stop processing and passing any more frames to the lower layer. Specifically, the DLL 24 will not process any upper layer data and therefore will not start any timers during this "timeout" period. Similarly, the lower layers will indicate to the data link layer when the congestion is over.

Figure 7:
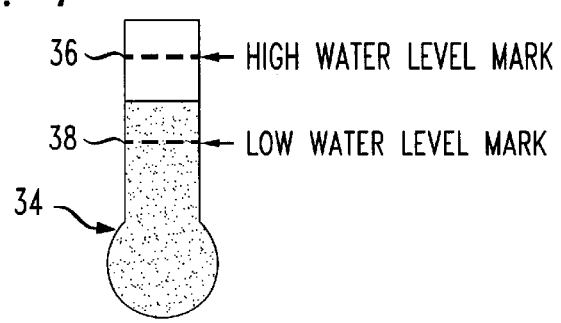
FIG. 7 is a schematic of the MAC layer queue.
Figure 4:
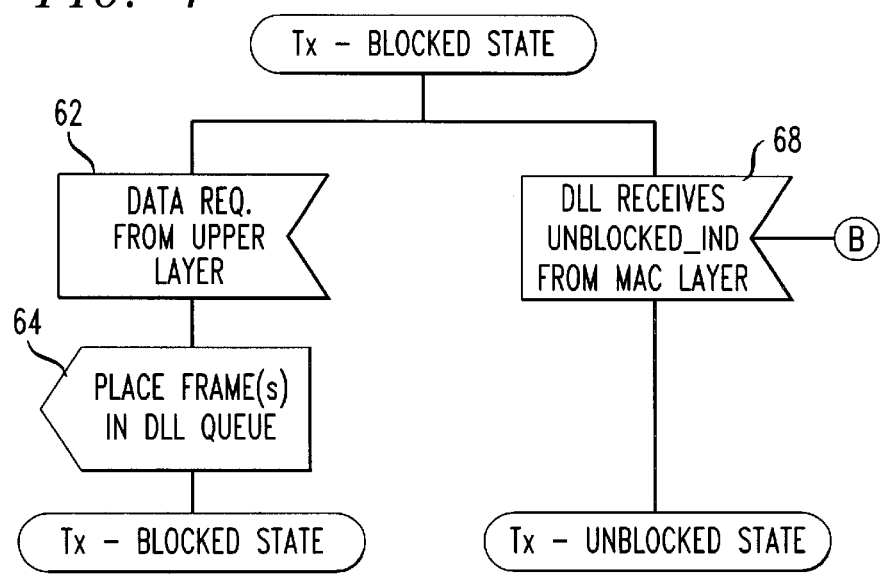
FIG. 4 is a flow diagram of Tx in a blocked state.
Figure 5:
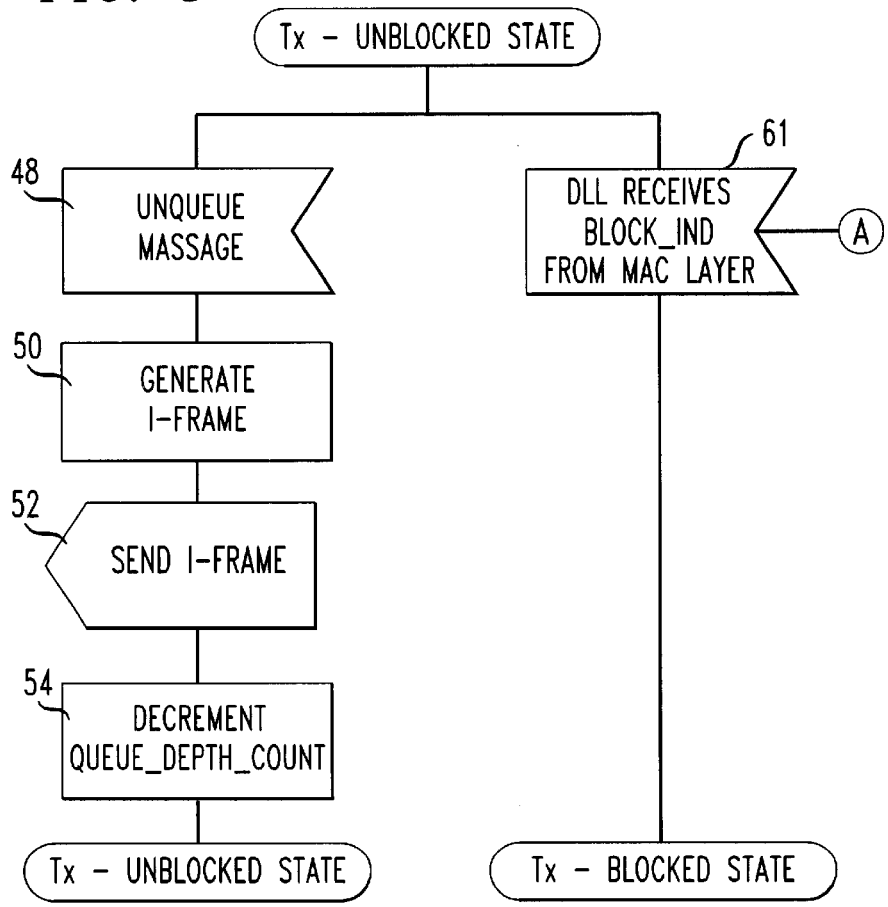
FIG. 5 is a flow diagram of Tx in an unblocked state.
Figure 6:
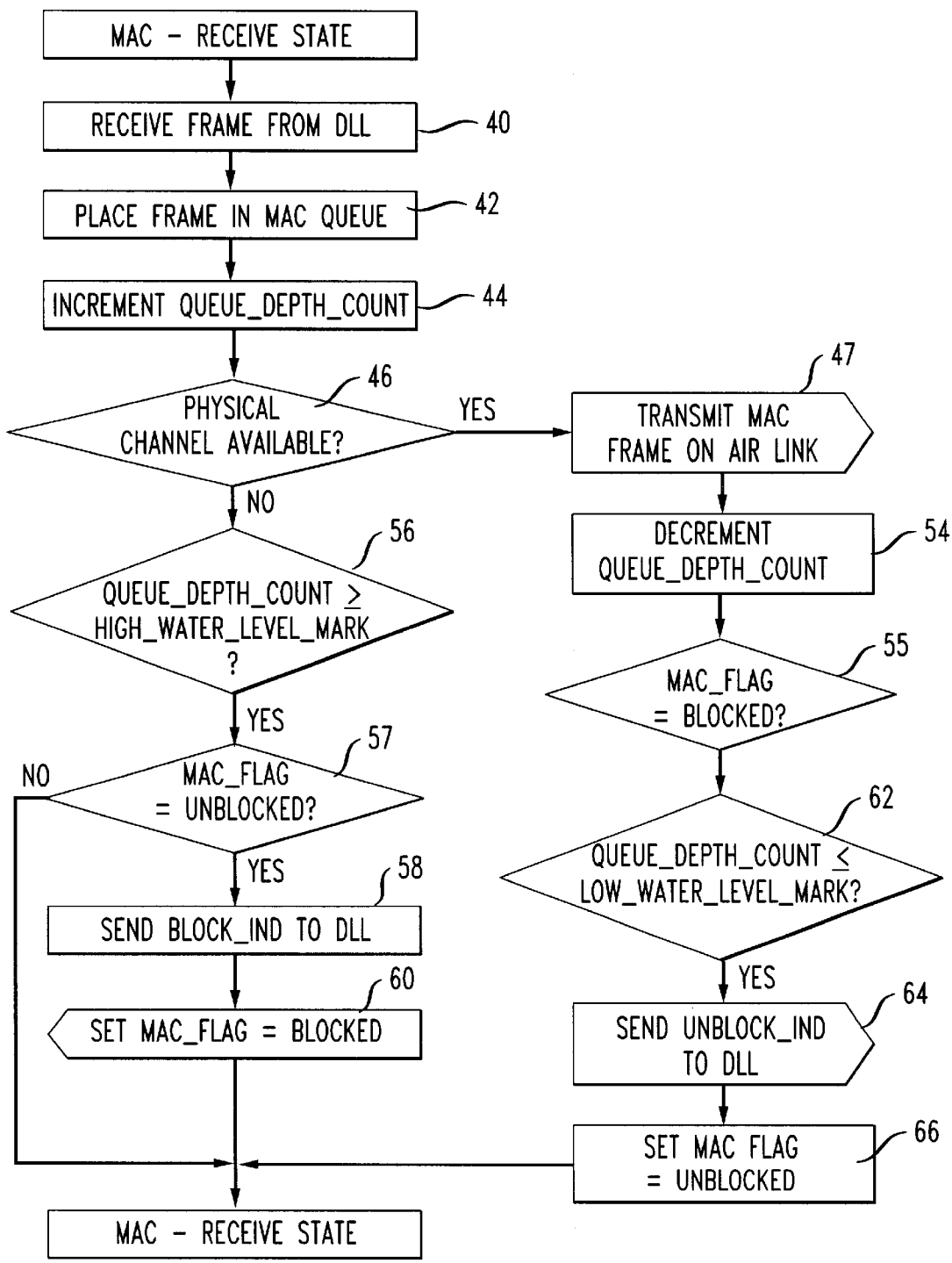
FIG. 6 is a flow diagram of the MAC layer dynamic control mechanism.

Referring now to FIGS. 4–6, there are depicted operational flow diagrams of the MAC dynamic congestion control in accordance with the invention. FIG. 4 is a flow diagram of Tx in a "blocked" or congested state. FIG. 5 is a flow diagram of Tx in the "unblocked" or uncongested state. FIG. 6 is a flow diagram of the MAC layer dynamic congestion control. In the illustrative application, control messages represented by BLOCK_IND and UNBLOCK_IND are utilized to communicate commands from the MAC to the over control path 32. The MAC layer 26 maintains a queue 34 with a High Level Water Mark 36 and a Low Level Water Mark 38 as depicted schematically in FIG. 7. Each time the MAC layer 26 receives a PDU from the DLL 24 at 40 (FIG. 6), it places the PDU into the queue 34 at 42 and increments a Queue_Depth_Count at 44. When a physical channel becomes available (at 46) to transmit the PDU to the Rx in accordance with well known principles described above and known in the art, the MAC layer 26 passes the PDU from the queue 34 onto the air link at 47 and decrements the Queue_Depth_Count at 54. Every time the MAC layer increments the Queue_Depth_Count, it checks at 56 whether the Queue_Depth_Count is greater than the High_Level_Water_Mark and if MAC_FLAG=Blocked at 57 (FIG. 6). If the Queue_Depth_Count is ≧High_Level_Water_Mark and MAC_FLAG=Blocked, then the MAC layer 26 sends a control message BLOCK_IND to the DLL 24 at 58. If MAC_FLAG=Unblocked at 57, then go to the MAC_Receive state. The MAC layer sets a flag MAC_FLAG=Blocked at 60. Upon receipt of BLOCK_IND at 61 from the MAC layer at the DLL 24, the DLL transitions to the BLOCKED state (FIG. 4, "Tx blocked state"), and the DLL 24 will suspend the transmission of frames to the MAC layer 26 at 62, stop processing the DLL higher layer message and queue all the messages received from the higher layers at the DLL queue at 64. Accordingly, this action causes a virtual cessation of frame traffic from the DLL 24 to the MAC layer 26 and no further processing at the DLL 24. The T200 timer (see FIG. 3) is suspended under this condition to prevent duplicate frame transmission which would occur upon expiration of the T200 timer. The congested condition is relieved as indicated by the Queue_Depth_Count. Specifically, the MAC layer 26 decrements the Que_Depth_Count at 54 after transmitting each frame over the air link at 47. If the MAC_FLAG is set to BLOCKED at 55 and the Que_Depth_Count≦Low_Water_Level at 62, the MAC layer sends UNBLOCK_IND to the DLL at 64 and sets flag MAC_FLAG=Unblocked at 66. The DLL 24 receives the control messages at 68 and transitions to the UNBLOCKED state (FIG. 5, "Tx unblocked state"). The DLL 24 will then pass frames to the MAC layer until the queue in the MAC layer falls within the specified range indicating congestion (see FIG. 7). In general, there needs to be enough of a gap between the high and low level water marks to avoid communicating excessive BLOCK and UNBLOCK control messages to the DLL 24. This gap may be based upon the physical line capacity and link parameters.

The present invention has been shown and described in what are considered to be the most preferred and practical embodiments. It is anticipated, however, that departures may be made therefrom and that obvious modifications will be implemented by those skilled in the art.

We claim:
1. In a wireless communications system, a base station including a medium access dynamic control mechanism, comprising:
  a data link layer and a medium access control layer, said data link layer and said medium access control layer connected to each other by data and control paths, said data path operable to exchange frames between said data link layer and said medium access control layer, said control path operable to exchange control messages between said data link layer and said medium access control layer;
  said data link layer including a queue for storing frames;
  said medium access control layer including a queue for storing frames;
  whereby said data link layer is adapted to pass new data frames from a higher layer relative to said data link layer into said data link layer queue upon receipt of a congestion message from said medium access control layer.

2. The medium access dynamic control mechanism of claim 1, wherein said congestion message is communicated to said data link layer in response to a predetermined congested state indicated by a level of stored frames in said medium access control layer queue.

3. The medium access dynamic access control mechanism of claim 2, wherein said data link layer has a retransmission timer associated with at least one frame and said retransmission timer is suspended upon receipt of said message from said medium access control layer.

4. In a wireless communications system, a base station including a medium access dynamic control mechanism, comprising:
  a data link layer and a medium access control layer, said data link layer and said medium access control layer connected to each other by data and control paths, said data path operable to exchange frames between said data link layer and said medium access control layer, said control path operable to exchange control messages between said data link layer and said medium access control layer;
  said data link layer including a queue for storing frames received from said medium access control layer, said data link layer having a retransmission timer;
  said medium access control layer including a queue for storing frames received from said data link layer;
  whereby said data link layer is adapted to pass new data frames from a higher layer relative to said data link layer into said data link layer queue and to suspend said retransmission timer upon a congestion message received from said medium access control layer, said congestion message being responsive to a level of stored frames in said medium access control queue.

* * * * *